UNITED STATES PATENT OFFICE.

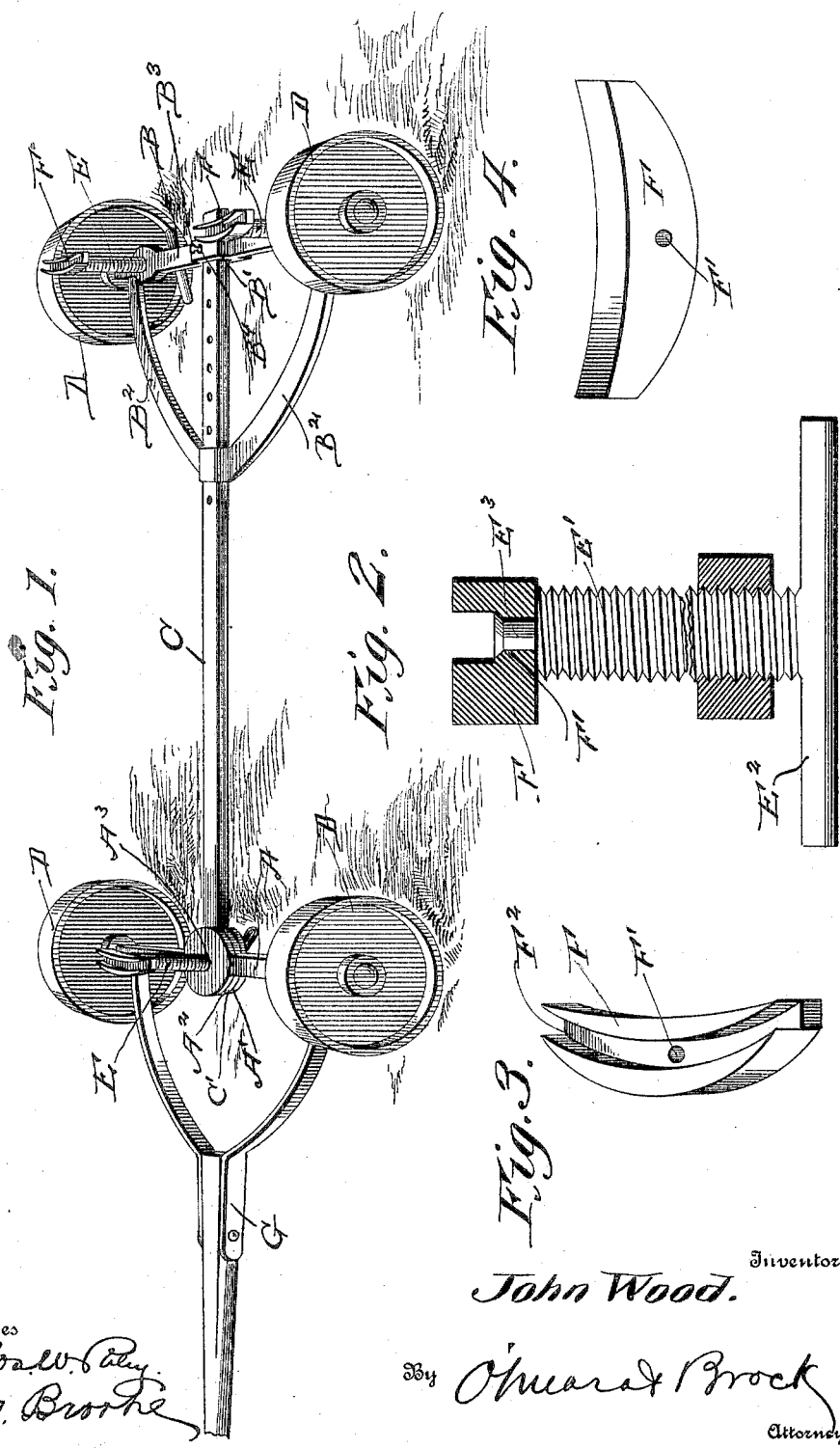

JOHN WOOD, OF CINCINNATI, IOWA.

STOVE LIFTER AND MOVER.

No. 817,030.  Specification of Letters Patent.  Patented April 3, 1906.

Application filed July 28, 1905. Serial No. 271,686.

*To all whom it may concern:*

Be it known that I, JOHN WOOD, a citizen of the United States, residing at Cincinnati, in the county of Appanoose and State of Iowa, have invented a new and useful Stove Lifter and Mover, of which the following is a specification.

My invention relates to certain new and useful improvements in stove lifters and movers, and has for its object to provide a truck that is very simple and cheap in construction and one that will facilitate the lifting and moving of stoves from place to place.

With these objects in view my invention consists in the novel features of construction and arrangement of parts more fully described, and pointed out in the claims.

In the accompanying drawings, forming a part of this specification, Figure 1 is a perspective view of my improved truck. Fig. 2 is a side elevation of the jack used in connection with my truck. Figs. 3 and 4 are perspective views of my improved jack-head used in connection with my truck.

Referring to the drawings, A indicates the front axle, B the rear axle, and C the adjustable reach connecting the axles A and B, which are provided with wheels D, having wide rims, so that in moving stoves in houses there will be no danger of injuring the carpets and floors. The front axle A is made flat and is provided with a centrally-enlarged circular portion A', provided with a horizontal slot $A^2$ and a vertical screw-threaded opening $A^3$, in which is mounted a jack E, consisting of a power-screw E', having a cross-bar or handle $E^2$ formed on its lower end. To the upper end of the power-screw E' is pivotally secured a head F by the pin $E^3$, which extends upwardly through the opening F', formed in the circular groove $F^2$ of the head. The back or rear axle is also made flat and is provided with two enlarged portions at each side, provided with screw-threaded openings adapted to receive the jack E, as hereinbefore described. The center of the rear axle is provided with an opening B' to receive the adjustable reach C, which passes through hound $B^2$, carried by the axle, and is adjustable through the axle by a vertical pin $B^3$, passing through the opening $B^4$ and through the series of holes formed in the reach. The forward part of the reach is made circular at C' and is adapted to fit into the slot $A^2$ of the front axle A and be pivotally secured therein by the power-screw E', which passes through the opening in C' and allows the front axle to turn by the tongue G, connected thereto.

From the foregoing description it will be seen that I provide a very simple stove-truck with lifting-jacks, so that the truck can be shoved under the stove and elevated, so that it can be carried from place to place, as may be desired.

Having thus fully described my invention, what I claim as new, and desire to secure by Letters Patent, is—

1. In a device of the kind described, the combination with a pair of axles having screw-threaded openings, of power-screws having blocks pivotally mounted on their upper ends working in said openings, and means for operating said screws as set forth.

2. In a device of the kind described, the combination with a truck provided with screw-threaded sockets, of power-screws secured in said sockets provided with adjustable grooved heads and means for operating said screws, for the purpose described.

3. In a device of the kind described, the combination with a truck provided with front and rear axles, wheels secured on said axles, screw-threaded openings formed in said axles, of power-screws secured in said openings, provided with adjustable heads, and means for raising and lowering said heads, for the purpose described.

4. In a device of the kind described, the combination with a truck provided with front and rear axles carrying wheels, of an adjustable reach connecting said axles, screw-threaded openings formed in the enlarged portion of said axles, power-screws mounted in said openings provided with reduced ends, circular grooved blocks provided with openings formed therein, through which the reduced ends of the screws are adapted to pass and a tongue secured to the front axle, for the purpose described.

5. In a device of the kind described, the combination with a truck provided with front and rear axles, spaced enlargements formed on the rear axle provided with threaded openings, a central enlarged portion formed on the front axle provided with a threaded opening, a reach connecting said axles, power-screws mounted in said openings provided with reduced ends, circular grooved blocks provided with openings through which the reduced ends of the screws are adapted to pass, and means for locking said blocks on said screws, for the purpose described.

6. In a device of the kind described, the combination with a truck provided with front and rear axles, provided with wheels, the rear axle being provided with hounds and a central opening, enlarged portions provided with screw-threaded openings formed on said axle on each side of the opening, a central enlarged slotted portion formed on the front axle provided with a screw-threaded opening, of a reach provided with spaced openings adjacent one end adapted to fit in the reach and the opening of the rear axle, an enlarged apertured portion formed on the other end of the reach adapted to fit in the slotted portion of the front axle, a power-screw provided with an adjustable block adapted to pass through the opening in the enlarged portion of the reach and the screw-threaded openings, of the front axle, power-screws provided with adjustable blocks mounted in the screw-threaded openings of the rear axle, and a pin adapted to pass through a vertical opening in the walls of the central opening of the rear axle, and one of the openings in the reach, for the purpose described.

JOHN WOOD.

Witnesses:
  JOHN STEWART,
  CHARLIE DOVE.